United States Patent

Reiner et al.

[15] 3,663,046

[45] May 16, 1972

[54] LOAD DISTRIBUTION AND ANTI-ROTATION MECHANISM

[72] Inventors: Thomas Reiner, Palos Verdes; Edward Dobyns, Valinda, both of Calif.

[73] Assignee: William S. Pine Inc., Los Angeles, Calif.

[22] Filed: Mar. 22, 1971

[21] Appl. No.: 126,453

[52] U.S. Cl. .......................287/58 CT, 287/52.05, 64/23
[51] Int. Cl. ...........................................F16b 7/10
[58] Field of Search ...............64/23, 8; 287/52.05, 53 LK, 287/53 SS, 57 CT; 114/235 A, 235 R, 230

[56] References Cited

UNITED STATES PATENTS

| | | | |
|---|---|---|---|
| 729,365 | 5/1903 | Lehman | 64/23 |
| 3,367,141 | 2/1968 | Baughman et al. | 64/23 |
| 3,486,476 | 12/1969 | Breit, Jr. | 114/235 R |

*Primary Examiner*—Andrew V. Kundrat
*Attorney*—Pendleton, Neuman, Seibold & Williams

[57] ABSTRACT

A load distribution and anti-rotation mechanism is provided which is adapted to withstand heavy and repeated transverse loads applied thereto. The mechanism includes first and second members arranged in telescoping relation. The first member is provided with an elongated bore in which the second member is slidably disposed. The bore surface carries a plurality of keys of substantially circular segment configuration which are arranged in angularly spaced relation and are disposed adjacent to but spaced from the open end of the bore. Portions of the keys project into the bore and are slidably disposed within elongated longitudinally extending grooves formed in the exterior of the second member. The second member also carries adjacent its inner end a plurality of keys of substantially circular segment configuration. The latter keys are in slidable contact with the bore surface.

9 Claims, 6 Drawing Figures

PATENTED MAY 16 1972  3,663,046

INVENTORS
THOMAS REINER
EDWARD DOBYNS

BY Pendleton, Neuman, Williams & Anderson
ATTORNEYS

LOAD DISTRIBUTION AND ANTI-ROTATION MECHANISM

BACKGROUND OF THE INVENTION

Oftentimes in many heavy duty mechanical linkage situations such as, for example, in a marine operation wherein a barge or disabled vessel is linked or secured for towing or pushing by a tugboat or similar motor vessel, mechanical couplers are utilized for this purpose in lieu of stanchions and cable or hawser combinations. The component parts of the coupling are frequently and repeatedly subjected to very heavy and sudden loads caused by relative movement of the members being linked together.

Heretofore, in various couplers of this general type, wherein certain of the parts thereof are in telescoping relation, excessive wear and deformation of the parts occur which seriously affect the stability and security of the linkage. Furthermore, where such a condition exists, the replacement of the worn parts is normally required which entails a costly and time-consuming operation. Where, on the other hand, due to circumstances beyond control, replacement of the worn parts cannot be undertaken, or where wear of the parts cannot be ascertained even with reasonable inspection, failure of the coupling can readily occur creating a most hazardous situation.

SUMMARY OF THE INVENTION

Thus, it is an object of this invention to provide a mechanism of the type described which is of simple yet sturdy construction wherein because of more uniform load distribution between coacting component parts thereof, wear of such parts is substantially reduced thereby prolonging the useful life of the mechanism.

It is a further object of this invention to provide a mechanism of the type described wherein if wear occurs it is confined to coacting parts which may be readily replaced.

It is a still further object of this invention to provide a mechanism which enables one or both of the telescoping members, when in fully extended relation, to yield a predetermined amount relative to the other member when a transverse load is applied without inflicting permanent damage to the members or causing failure thereof.

Further and additional objects will appear from the description, accompanying drawing, and appended claims.

In accordance with one embodiment of the invention, a mechanism of the type described is provided which includes a first member provided with an elongated open end bore and a second member telescopingly mounted within said bore. The bore surface is provided with a plurality of angularly spaced pockets which are disposed adjacent to but spaced from the open end of the bore. Each pocket accommodates a first key having a circular segment configuration whereby a substantial portion of the arcuate periphery of the key is disposed within the pocket, and the remainder of the key extends a substantial distance into the bore and slidably engages an elongated longitudinally extending groove formed on the exterior of the second member. The exterior of the second member is also provided with a plurality of angularly spaced pockets disposed adjacent to but spaced from the inner end of said second member. Each pocket of the second member accommodates a second key of substantially circular segment configuration. The arcuate peripheral portion of the second key is disposed within a second member pocket, and the remainder of the second key is in slidable contact with the bore surface. The first and second keys coact with said telescoping members, when the latter are in a fully extended relation, to permit the axis of the second member to become slightly askew relative to the axis of the bore when the second member is subjected to a transverse force without damaging the component parts or impairing their usefulness.

DESCRIPTION

For a more complete understanding of the invention reference should be made to the drawings wherein:

FIGS. 1 and 1a are diagrammatic sectional views of a pair of conventional telescoping members shown in extended relations and with a transverse load shown, being applied to the fully extended member in FIG. 1a.

Figure 1:
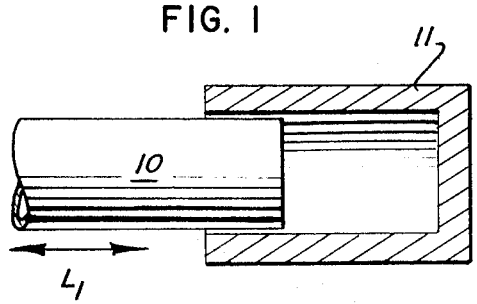
Figure 1A:
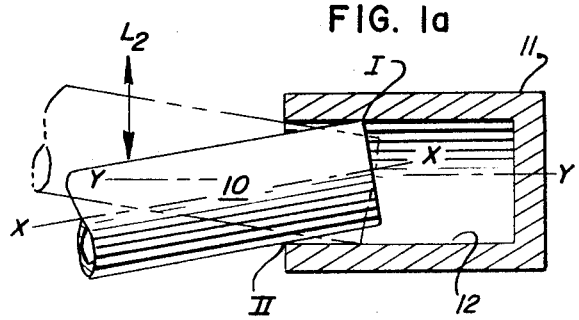

Referring now to the drawings and more particularly to FIGS. 1 and 1a, a pair of conventional heavy duty telescoping members 10 and 11 are shown in an extended relation. In FIG. 1 the members are shown in a is in extended relation wherein an axial thrust load $L_1$ is being applied to member 10. In FIG. 1a there is shown a transverse load $L_2$ being applied to the extended member 10 causing the latter to assume a cocked position relative to member 11. When member 10 is in the cocked position, which is shown in an exaggerated state in FIG. 1a, the axis $x$—$x$ of member 10 is askewed relation with respect to the axis $y$—$y$ of the bore 12 formed in member 11. The relative angular disposition between axes $x$–$x$ and $y$–$y$ will depend upon the magnitude and direction of load $L_2$ applied, the area on member 10 wherein the load $L_2$ is applied, the extent to which member 10 is extended from the open end 12a of bore 12, and the normal amount of sliding clearance between the exterior of member 10 and the surface of the bore 12.

Regardless of the contingencies aforenoted, for a given transverse load $L_2$, there results in the conventional construction a problem at points I and II, see FIG. 1a, wherein severe scoring, defacement and deformation of the bore surface and exterior of member 10 occurs which after a very short period of time seriously impairs the operation of the members. Unless some provision is made to permit relative movement of the extended member so that it can assume a cocked position when a transverse load is applied, the extended member may become permanently distorted, thereby preventing further retraction of the one member into the other.

As previously mentioned, the aforementioned problems can become particularly acute in various marine operations such as in coupling together a tugboat and barge for towing and pushing or in docking a barge or vessel to a mooring or pier. An example of the type of coupling operation referred to is shown in Briet U.S. Pat. No. 3,486,476. In such marine operations repeated applications of transverse loads of high magnitude are oftentimes experienced where the operation is performed on a body of water which is other than in a quiescent state.

One form of an improved mechanism 13, which eliminates or materially reduces the aforenoted problems which beset conventional structures, is shown in FIGS. 2–5. In mechanism 13, telescoping members 14 and 15, corresponding to members 10 and 11, are provided. Normally, member 15 and other accessories, not shown, are fixedly secured to the barge, mooring or pier, and member 14, in turn, is secured to the bow of the motor vessel, not shown. Member 15 is provided with an elongated bore 16 open at least at one end 16a. Formed in the bore surface and disposed adjacent to but spaced from the end 16a, are a plurality of pockets 17 uniformly spaced and symmetrically arranged about the axis of the bore 16. If desired, the pockets 17 may include a bearing insert or shoe 18.

Figure 4:
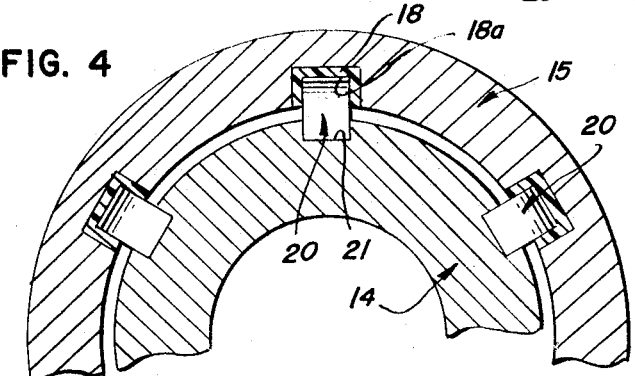
FIG. 4 is a fragmentary sectional view taken along line 4—4 of FIG. 2.

Disposed within each pocket 17 and in contact with the bearing insert 18 thereof, is the arcuate peripheral portion 20a of a key 20 which is preferably of substantially circular segment configuration. The surface 18a of the insert 18, in contact with the key portion 20a, is shaped so as to conform thereto. A substantial portion 20b of key 20 projects into the bore 16 and is slidably disposed within an elongated longitudinally extending groove 21 formed in the exterior of member 14. As seen in FIG. 4 the cross-sectional shape of groove 21 closely resembles the cross-sectional shape of key portion 20b; thus, one function of keys 20 is that they are capable of preventing undesirable relative rotation between members 14 and 15.

Figure 2:
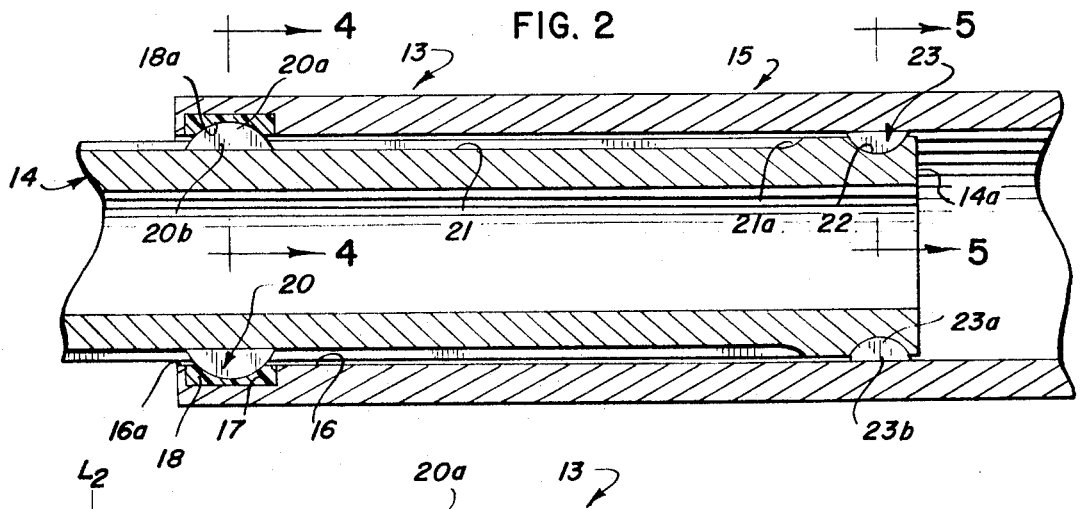
FIG. 2 is an enlarged, fragmentary, longitudinal, vertical, sectional view of one form of the improved mechanism and showing the telescoping members in retracted relation.
Figure 3:
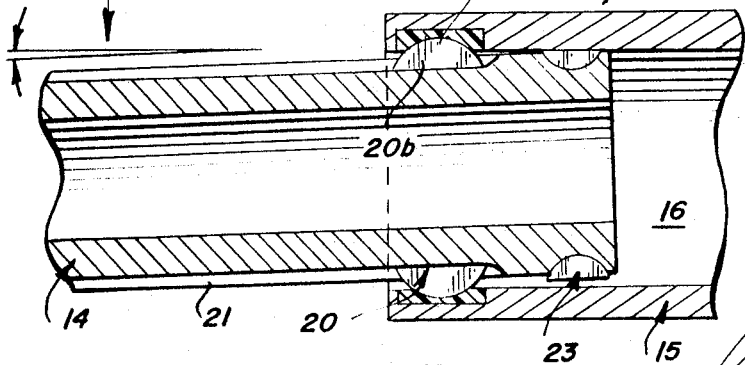
FIG. 3 is an enlarged, fragmentary, longitudinal, vertical, sectional view of the mechanism shown in FIG. 2 but with the telescoping members in a fully extended relation and a transverse load being applied to the extended member.
Figure 5:
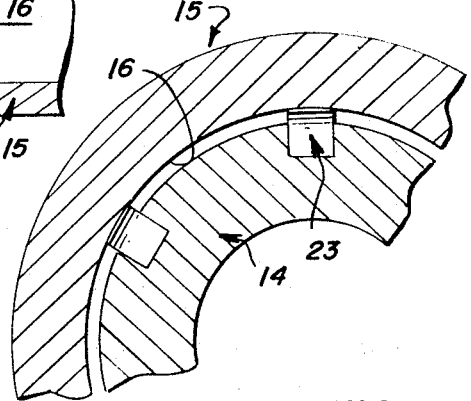
FIG. 5 is a fragmentary sectional view taken along line 5—5 of FIG. 2.

As seen in FIGS. 2 and 3, the inner termini 21a of grooves 21 are disposed adjacent to but spaced from the inner end 14a of member 14. Formed in the exterior of member 14 and disposed within the area delimited by the groove termini 21a and the inner end 14a of member 14 are a plurality of uniformly spaced pockets 22 which are symmetrically arranged about the axis of member 14. Each pocket 22 is adapted to accommodate a key 23 which is of a design similar to key 20. The arcuate peripheral portions 23a of keys 23 extend radially inwardly relative to the axis of bore 16 whereas the arcuate peripheral portions 20a of keys 20 extend radially outwardly relative to the bore axis. The outer or flattened portion 23b of each key 23 is adapted to be in sliding engagement with the bore surface.

The keys 20 and 23 coact with members 14 and 15 so as to distribute substantially uniformly, the loads applied to member 14 and at the same time permit members 14 and 15 to assume askewed relative positions without adversely affecting operation of the members. When member 14 is in its fully extended position, as seen in FIG. 3, the load forces are transmitted from member 14 through the keys 20 and 23 to member 15. Notwithstanding that member 14 assumes an askewed position with respect to member 15, the direction of force exerted on the pockets 17 and inserts 18 by keys 20 and on the surface of the bore 16 by keys 23 will be substantially normal to the axis of the bore. Thus, a single point contact between the members 14 and 15 can be avoided, and the problem of severe scoring, defacement and deformation is substantially eliminated.

In order to avoid galling between the keys and the members 14 and 15, it is important that the keys be of a material dissimilar to that of the members and that a suitable lubricant be utilized to minimize friction between the moving parts. Furthermore, it is important that the material and relative sizes of the various components of the mechanism 13 be designed with the necessary safety factors so that the anticipated loads to be applied to the mechanism will produce pressures and stresses which are far below the elastic limits of the members and keys.

While the improved mechanism has been described in relation to marine operations, it is to be understood, of course, that it is not intended to be limited thereto but may be utilized in various other situations wherein heavy duty coupling is required. Furthermore, while member 14 is shown to be of tubular design, it may, however, be of rod like construction if desired.

Thus, it will be seen that a load-distribution and anti-rotational mechanism has been provided which is of simple construction, reduces maintenance and service problems, and is capable of readily handling heavy loads applied thereto.

We claim:

1. A load distribution and anti-rotation mechanism comprising a first member provided with an elongated bore open at one end, the bore surface being provided with a set of first pockets arranged in angularly spaced relation and disposed adjacent to but spaced from the bore open end; a set of first keys of substantially arcuate segment configuration, the arcuate peripheral portion of each key being disposed within a pocket and the remainder of at least one key projecting a substantial distance into said bore; an elongated second member mounted for telescoping movement within said bore, the exterior of said second member being provided with an elongated longitudinally extending groove in which the projecting remainder of said one key is slidably disposed, and a set of second pockets arranged in angularly spaced relation and disposed adjacent to but spaced from the inner end of said second member; and a set of second keys of substantially arcuate segment configuration, the arcuate peripheral portion of each second key being disposed within a second pocket, the remainder of each second key being in sliding contact with the bore surface.

2. The mechanism of claim 1 wherein the first pockets are symmetrically arranged about the bore surface, and the second pockets are symmetrically arranged about the exterior of said second member.

3. The mechanism of claim 1 wherein the shape of each pocket substantially conforms to the arcuate peripheral configuration of the key portion accommodated therein.

4. The mechanism of claim 1 wherein the remainder of each first key projects a substantial distance into said bore, and the exterior of said second member is provided with a plurality of elongated longitudinally extending grooves, one groove being provided for each first key.

5. The mechanism of claim 1 wherein the groove terminates short of the inner end of said second member and the second pockets are disposed in longitudinally spaced relation with respect to the terminus of said groove.

6. The mechanism of claim 1 wherein said second member is of tubular configuration and a portion thereof continuously projects outwardly from the open end of said bore regardless of the relative telescoping positions of said first and second members.

7. The mechanism of claim 1 wherein the arcuate peripheral portion of each first key extends radially outwardly relative to the axis of said bore and the arcuate peripheral portion of each second key extends radially inwardly relative to said bore axis.

8. The mechanism of claim 1 wherein each first pocket includes a bearing insert, each insert having a bearing surface in contact with and conforming to the arcuate peripheral portion of a first key.

9. A load distribution and anti-rotation mechanism comprising a first member provided with an elongated bore open at one end, the bore surface being provided with a set of first pockets symmetrically arranged about the axis of the bore and disposed adjacent to but spaced from the bore open end; a set of first keys of substantially arcuate segment configuration, each first key having an arcuate peripheral portion thereof disposed within a first pocket and the remainder of said first key projecting a substantial distance into said bore, each first pocket having a bearing surface in contact with and conforming substantially to the arcuate peripheral portion of the accommodated first key; an elongated second member mounted for telescoping movement within said bore, the exterior of said second member being provided with elongated longitudinally extending grooves symmetrically arranged about the axis of said second member and in which the projecting remainders of said first keys are slidably disposed, and a set of second pockets symmetrically arranged about the axis of said second member and disposed adjacent to but spaced from the inner end of said second member; and a set of second keys of substantially arcuate segment configuration, an arcuate peripheral portion of each second key being disposed within a second pocket, each second pocket having a bearing surface in contact with and conforming substantially to the arcuate peripheral portion of the accommodated second key, the remainder of each second key being in slidable engagement with the surface of said bore; said first and second keys coacting with said members upon application of a transverse load to effect substantially uniform load distribution whether said members are in retracted or extended relation; said first and second keys further coacting to normally maintain the axis of said second member in substantially coaxial relation with the axis of said bore and to permit said axes to assume a predetermined askewed relation when said members are in a fully extended relation and a transverse load is applied to one of said members.

* * * * *

UNITED STATES PATENT OFFICE
CERTIFICATE OF CORRECTION

Patent No. 3,663,046            Dated May 16, 1972

Inventor(s) THOMAS REINER and EDWARD DOBYNS

It is certified that error appears in the above-identified patent and that said Letters Patent are hereby corrected as shown below:

Column 2, line 19 - after "a" delete "is in"
        and insert therefor -- normal --

Column 2, line 26 - after "is" insert -- in --

Signed and sealed this 5th day of September 1972.

(SEAL)
Attest:

EDWARD M. FLETCHER, JR.           ROBERT GOTTSCHALK
Attesting Officer                Commissioner of Patents